(12) United States Patent
Hoka et al.

(10) Patent No.: US 10,466,526 B2
(45) Date of Patent: Nov. 5, 2019

(54) LIQUID CRYSTAL DISPLAY DEVICE AND METHOD FOR MANUFACTURING TFT ARRAY SUBSTRATE

(71) Applicant: Mitsubishi Electric Corporation, Tokyo (JP)

(72) Inventors: Naruhito Hoka, Tokyo (JP); Manabu Tanahara, Tokyo (JP); Takeshi Sonoda, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/858,645

(22) Filed: Dec. 29, 2017

(65) Prior Publication Data

US 2018/0210278 A1 Jul. 26, 2018

(30) Foreign Application Priority Data

Jan. 26, 2017 (JP) ................. 2017-011942

(51) Int. Cl.
  *G02F 1/1333* (2006.01)
  *G02F 1/1335* (2006.01)
  *G02F 1/1362* (2006.01)

(52) U.S. Cl.
  CPC .. *G02F 1/133512* (2013.01); *G02F 1/133345* (2013.01); *G02F 1/136227* (2013.01)

(58) Field of Classification Search
  None
  See application file for complete search history.

(56) References Cited

U.S. PATENT DOCUMENTS

| | | | |
|---|---|---|---|
| 2002/0163603 A1* | 11/2002 | Cho | G02F 1/136227 349/43 |
| 2005/0094046 A1 | 5/2005 | Cho et al. | |
| 2014/0028942 A1* | 1/2014 | Takeuchi | G02F 1/136227 349/43 |
| 2015/0138476 A1* | 5/2015 | Hyodo | G02F 1/136227 349/43 |
| 2017/0235173 A1 | 8/2017 | Katoh et al. | |

FOREIGN PATENT DOCUMENTS

| | | |
|---|---|---|
| JP | 2002-341385 A | 11/2002 |
| JP | 2004-294805 A | 10/2004 |
| WO | 2016/039211 A1 | 3/2016 |
| WO | 2016/104216 A1 | 6/2016 |

* cited by examiner

*Primary Examiner* — Richard H Kim
(74) *Attorney, Agent, or Firm* — Studebaker & Brackett PC

(57) ABSTRACT

A liquid crystal display device is equipped with: a TFT array substrate having a thin film transistor in each of pixel areas; and a counter substrate having a black matrix in which an opening part is formed in each of areas corresponding to the pixel areas. The TFT array substrate includes: a protective film formed on a drain electrode of the thin film transistor; a contact hole formed in the protective film so as to reach the drain electrode; and a pixel electrode formed on the protective film and connected to the drain electrode through the contact hole. An inner wall of the contact hole includes a first sloped part and a second sloped part which are arranged in line in a circumferential direction of the contact hole and have slope angles different from each other.

3 Claims, 6 Drawing Sheets

LIQUID CRYSTAL DISPLAY DEVICE AND METHOD FOR MANUFACTURING TFT ARRAY SUBSTRATE

BACKGROUND OF THE INVENTION

Field of the Invention

The present invention relates to a liquid crystal display device and, in particular, to a technology for increasing an aperture ratio of pixels.

Description of the Background Art

As a resolution of the liquid crystal display device (LCD) becomes higher, a size of each pixel becomes smaller, whereby the aperture ratio of pixels becomes lower. If an output of the backlight is made larger, the low aperture ratio can be compensated; however, a problem arises in which the power consumption is increased. Conversely, if the aperture ratio of pixels is increased, it is effective in reducing the power consumption of the liquid crystal display device.

Factors affecting the aperture ratio of a pixel include, for example, widths of a scanning line and a signal line, an interval between a pixel electrode and a signal line, an interval between a pixel electrode and a scanning line, an overlapping width between a black matrix and a pixel electrode, areas of electrodes of a thin film transistor (TFT), and an area of a contact hole for connecting a drain electrode and a pixel electrode of the thin film transistor, and if these factors can be smaller, the aperture ratio of a pixel can be increased.

For example, Japanese Patent Application Laid-Open No. 2002-341385 proposes a technology in which a drain electrode of a thin film transistor is made shorter than before to increase a part through which light passes, thereby increasing the aperture ratio of pixels.

According to the technology of Japanese Patent Application Laid-Open No. 2002-341385, the contact hole is formed to extend beyond the drain electrode to an extent corresponding to the length by which the drain electrode is made shorter. At a step part created by the contact hole, liquid crystal is abnormally aligned, and the black matrix on the counter substrate needs to shield light on the area on which the contact hole is formed. Therefore, from the point of view of the aperture ratio of pixels, it is desirable that the contact hole have a small area.

The area of the contact hole can be made smaller by making the inner wall of the contact hole vertically, for example. However, if the inner wall of the contact hole is made vertical, the coverage of the pixel electrode over the inner wall of the contact hole is lower, and the electric connectivity between the pixel electrode and the drain electrode of the thin film transistor can be lower.

SUMMARY

An object of the present invention is to provide a liquid crystal display device in which the area of the contact hole for connecting the pixel electrode and the drain electrode of the thin film transistor can be made smaller while ensuring the electric connectivity between the two electrodes.

A liquid crystal display device according to the present invention includes: a TFT array substrate having a thin film transistor formed in each of pixel areas; and a counter substrate including a black matrix in which an opening part is formed in each of areas corresponding to the pixel areas. The TFT array substrate includes: a protective film formed on a drain electrode of the thin film transistor; a contact hole formed in the protective film to reach the drain electrode; and a pixel electrode formed on the protective film to be connected to the drain electrode through the contact hole. An inner wall of the contact hole includes a first sloped part and a second sloped part which are arranged in line in a circumferential direction of the contact hole and have slope angles different from each other.

With the present invention, electric connectivity between the pixel electrode and the drain electrode can be high by, for example, providing a part which is of the inner wall of the contact hole and has a small slope angle, on the drain electrode of the thin film transistor. Further, for example, if a part which is of the inner wall of the contact hole and has a large slope angle is provided on the opening part side of the black matrix so that the area of the contact hole can be small, the area of the black matrix can be small, whereby the aperture ratio of the pixel can be increased.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred Embodiment

Figure 1:
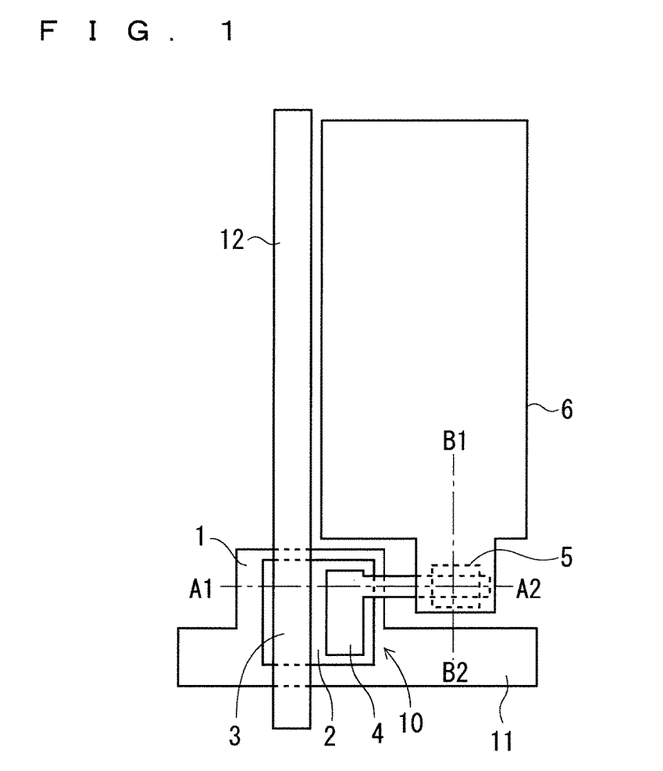
FIG. 1 is a plan view of a unit pixel of a TFT array substrate of a liquid crystal display device according to a preferred embodiment of the present invention.
Figure 2:
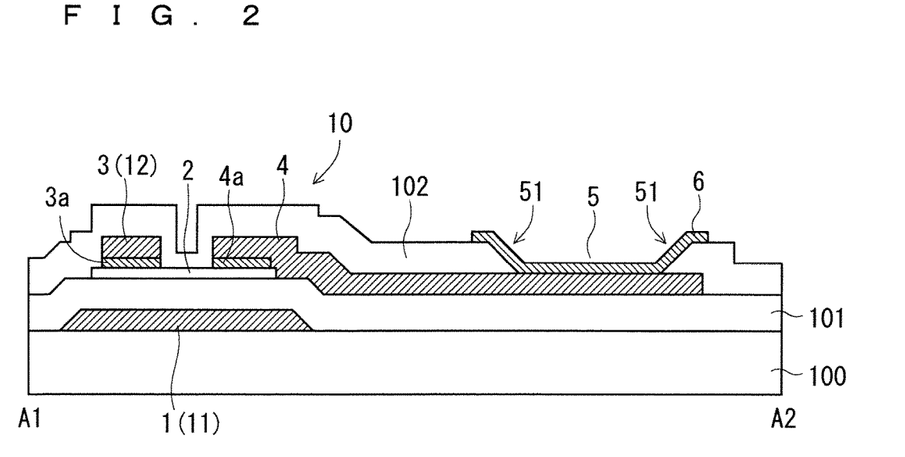
FIG. 2 is a sectional view of the TFT array substrate shown in FIG. 1 along line A1-A2.
Figure 3:
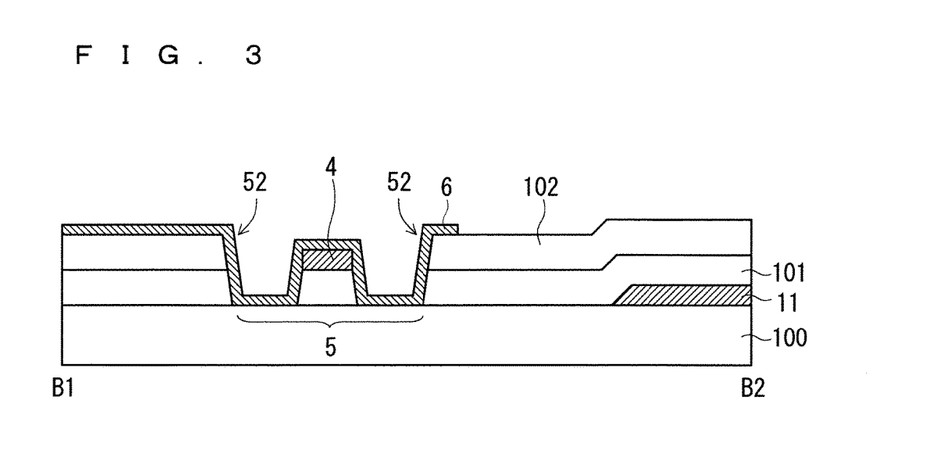
FIG. 3 is a sectional view of the TFT array substrate shown in FIG. 1 along line B1-B2.

FIG. 1 is a diagram showing a configuration of a liquid crystal display device according to a preferred embodiment of the present invention and shows a plan view of a unit pixel of a TFT array substrate of the liquid crystal display device. FIG. 2 and FIG. 3 are sectional views of the unit pixel. FIG. 2 corresponds to the cross-section along line A1-A2 of FIG. 1, and FIG. 3 corresponds to the cross-section along line B1-B2 of FIG. 1. Note that FIG. 1 does not show an insulating substrate 100, a gate insulating film 101, a protective film 102, or ohmic contact layers 3a and 4a shown in FIGS. 2 and 3.

Hereinafter, with reference to these drawings, a configuration of the liquid crystal display device according to the present preferred embodiment will be described. As shown in FIGS. 2 and 3, the TFT array substrate is formed by using the insulating substrate 100 as a base material. On the insulating substrate 100, there are provided a plurality of scanning lines 11 at constant intervals. In addition, a plurality of signal lines 12 are provided, at constant intervals, perpendicular to the scanning lines 11. Each of the areas defined by adjacent two scanning lines 11 and adjacent two signal lines 12 is a pixel area in which the unit pixel is provided. Therefore, on the TFT array substrate, there are provided unit pixels each shown in FIG. 1 are provided in a matrix.

As shown in FIG. 1, in a vicinity of an intersection between each of the scanning lines 11 and each of the signal lines 12, there is formed a thin film transistor 10. The thin film transistor 10 is equipped with a gate electrode 1, a semiconductor layer 2, a source electrode 3, and a drain electrode 4. The gate electrode 1 is connected to the scanning line 11, and the source electrode 3 is connected to the signal line 12. The drain electrode 4 is connected to a pixel electrode 6 formed on the almost entire pixel area.

With reference to FIGS. 1 and 2, the scanning line 11 and the gate electrode 1 are made of a first wiring layer on the surface of the insulating substrate 100 and are connected to each other. That is, the gate electrode 1 is configured with a part of the scanning line 11. On the gate electrode 1 and the scanning line 11, there is formed an insulating film 101. The insulating film 101 functions as a gate insulating film of the thin film transistor 10 and is therefore referred to as a "gate insulating film 101."

The semiconductor layer 2 functioning as a channel region of the thin film transistor 10 is provided on the gate insulating film 101 so as to overlap the gate electrode 1. Further, the signal line 12, the source electrode 3, and the drain electrode 4 are formed of a second wiring layer on the gate insulating film 101 and the semiconductor layer 2. The signal line 12 and the source electrode 3 are connected to each other. That is, the source electrode 3 is configured with a part of the signal line 12.

The source electrode 3 and the drain electrode 4 are formed apart from each other on the semiconductor layer 2. Further, an ohmic contact layer 3a is formed between the source electrode 3 and the semiconductor layer 2, and an ohmic contact layer 4a is formed between the drain electrode 4 and the semiconductor layer 2.

The protective film 102 is formed on the signal line 12, the source electrode 3, and the drain electrode 4. The pixel electrode 6 is formed on the protective film 102 and is electrically connected to the drain electrode 4 through a contact hole 5 formed in the protective film 102. The pixel electrode 6 is formed of a transparent conductive film such as Indium Tin Oxide (ITO).

In order to make a light transmissive area large, it is preferable that the drain electrode 4 of the thin film transistor 10 be small. In the present preferred embodiment, the width of the drain electrode 4 is made smaller than a diameter of the contact hole 5 as shown in FIG. 3. Conversely, the contact hole 5 is formed so as to partially extend beyond the drain electrode. Further, the part of the contact hole 5 extending beyond the drain electrode 4 penetrates through the gate insulating film 101 and reaches the insulating substrate 100. Therefore, the pixel electrode 6 is in contact with the upper surface and the side surface of the drain electrode 4, in the contact hole 5.

The liquid crystal display device according to the present preferred embodiment is configured with the TFT array substrate having the structure shown in FIGS. 1 to 3 and a counter substrate having a black matrix (not shown) disposed to face each other and is configured with liquid crystal held between the TFT array substrate and the counter substrate. The black matrix on the counter substrate is a light shielding film having opening parts in areas each of which corresponds to each of the pixel areas. More specifically, the black matrix is provided on the counter substrate such that when the counter substrate is disposed to face the TFT array substrate, the black matrix covers the scanning lines 11, the signal lines 12, the thin film transistors 10 (the gate electrodes 1, the semiconductor layers 2, the source electrodes 3, and the drain electrodes 4) and the contact holes 5. In other words, when viewed from the direction perpendicular to the surface of the insulating substrate 100, the black matrix overlaps, in the TFT array substrate of the liquid crystal display device, the scanning lines 11, the signal lines 12, the thin film transistors 10 (the gate electrodes 1, the semiconductor layers 2, the source electrodes 3, and the drain electrodes 4), and the contact holes 5.

In the case of a liquid crystal display device for displaying a color image, a color filter is provided in each of the opening parts of the black matrix. Further, for example, in the case of a liquid crystal display device of a vertical field driving type such as a Twisted Nematic (TN) type, the counter substrate is provided with a common electrode to which a potential (common potential) is supplied. On the other hand, in the case of the liquid crystal display device of a lateral field driving type such as an In-Plane-Switching type or a Fringe Field Switching (FFS) type, the common electrode is provided on the TFT substrate side.

Here, a structure of the contact hole 5 formed in the protective film 102 of the TFT array substrate will be described. As shown in FIGS. 2 and 3, the inner wall of the contact hole 5 is equipped with first sloped parts 51 and second sloped parts 52, where each of the first sloped parts 51 and each of the second sloped parts 52 have slope angles different from each other. Each of the first sloped parts 51 and each of the second sloped parts 52 are disposed in line in the circumferential direction (that is, in the direction perpendicular to the depth direction of the contact hole 5) of the contact hole 5. In the present preferred embodiment, the slope angle of the second sloped parts 52 is set larger than the slope angle of the first sloped parts 51.

The first sloped parts 51 having a gentle slope are formed on surfaces, of the inner wall of the contact hole 5, located at positions on the drain electrode 4. In addition, the second sloped parts 52 having a steep slope are formed on surfaces, of the inner wall of the contact hole 5, located on the part extending beyond the drain electrode 4. The slope angle of the first sloped parts 51 is preferably not less than 45° and not more than 55°. The slope angle of the second sloped parts 52 is preferably not less than 80° and not more than 90°.

As shown in FIG. 3, in the present preferred embodiment, the contact hole 5 is formed to cross over the drain electrode 4, and the contact hole 5 extends beyond the both sides of the drain electrode 4. In particular, it is important that the second sloped part 52 having a steep slope is provided on the surface, of the inner wall of the contact hole 5, on the side closer to the center of the pixel area (the left side in FIG. 3). This is because since the side, of the inner wall of the contact hole 5, closer to the center of the pixel area corresponds to the opening part side of the black matrix, if the slope of that part is made nearly vertical so as to make the area of the contact hole 5 smaller, the opening part of the black matrix can be made larger, whereby the aperture ratio of the pixel can be increased. On the other hand, the slope of the second sloped part 52 provided on the surface, of the inner wall of the contact hole 5, on the side distant from the center of the pixel area (the right side in FIG. 3) is not necessarily steep.

Generally, that part of the contact hole 5 is covered by the black matrix and does not contribute to the increase in the aperture ratio of the pixel.

Further, coverage of the pixel electrode 6 on the first sloped parts 51 having a gentle slope is high. Therefore, by providing the first sloped part 51 on the drain electrode 4 as shown in FIG. 2, electric connectivity between the pixel electrode 6 and the drain electrode 4 can be favorable.

As described above, with the present preferred embodiment, it is possible to increase the aperture ratio of the pixel while ensuring the good electric connectivity between the pixel electrode 6 and the drain electrode 4 of the thin film transistor 10 by making smaller the area of the contact hole 5 for connecting the pixel electrode 6 to the drain electrode 4.

Next, a method for manufacturing the TFT array substrate shown in FIGS. 1 to 3 will be described. FIGS. 4 to 11 are manufacturing process charts of the TFT array substrate. Of these drawings, FIGS. 4, 6, 8, and 10 correspond to the cross-section shown in FIG. 2, and FIGS. 5, 7, 9, and 11 correspond to the cross-section shown in FIG. 3.

Figure 4:
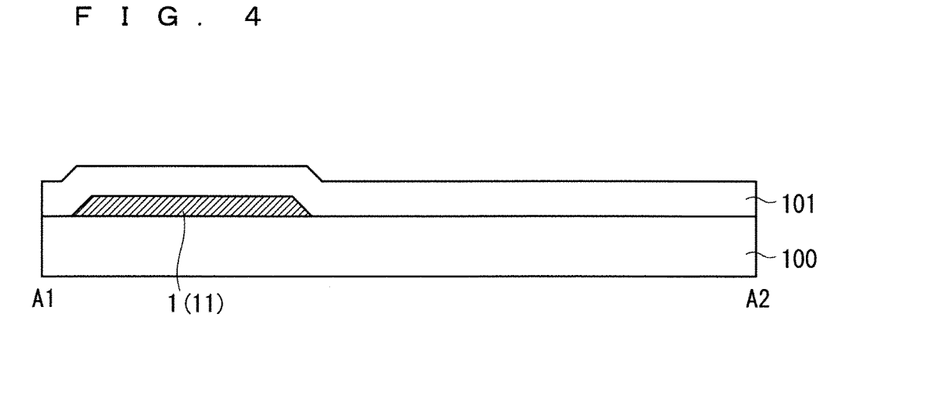
FIGS. 4 to 11 are manufacturing process charts of a TFT array substrate according to a preferred embodiment of the present invention.
Figure 5:
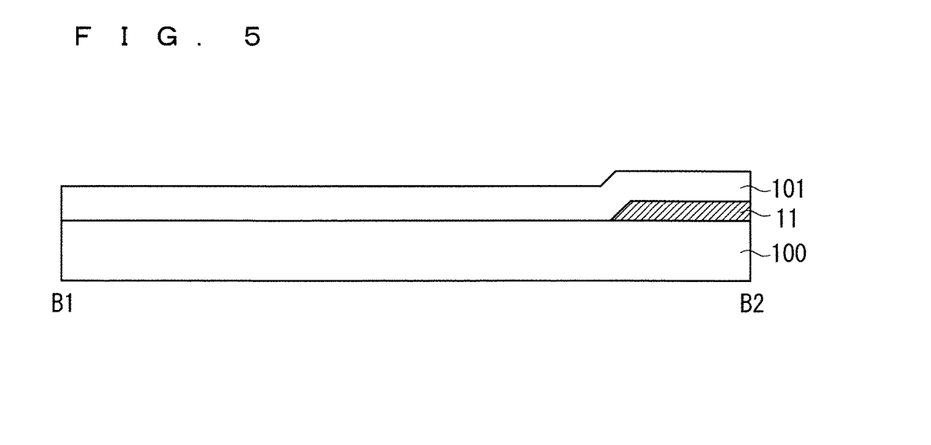

First, a conductive metal such as AlNd or aluminum (Al) is deposited on the insulating substrate 100 by a sputtering method. Then, the gate electrode 1 and the scanning line 11 are formed by patterning the conductive metal by a selective etching process using a photolithography technology. Subsequently, the gate insulating film 101 is formed on the entire surface of the insulating substrate 100 including the gate electrode 1 and the scanning line 11 by vapor depositing an insulating material such as silicon nitride by using a chemical vapor deposition method (FIGS. 4 and 5). Next, the semiconductor layer 2 and the ohmic contact layers 3a and 4a are formed on the gate insulating film 101, by sequentially depositing, for example, hydrogenated amorphous silicon (a-Si:H) and doped hydrogenated amorphous silicon (n$^+$a-Si:H) by a chemical vapor deposition method and by patterning the deposited layers by a selective etching process using a photolithography technology. As the material for the semiconductor layer 2, an oxide semiconductor such as In—Ga—Zn—O may be used.

Figure 6:
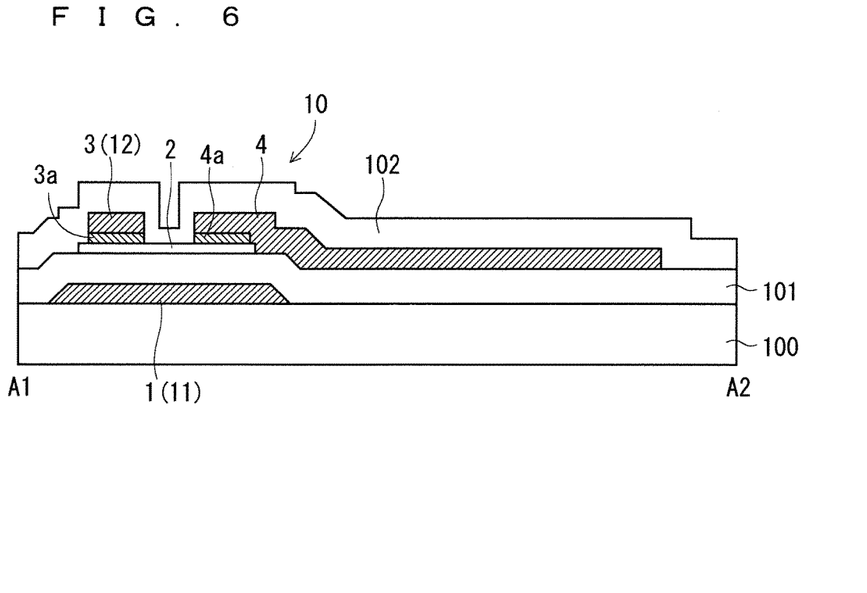
Figure 7:
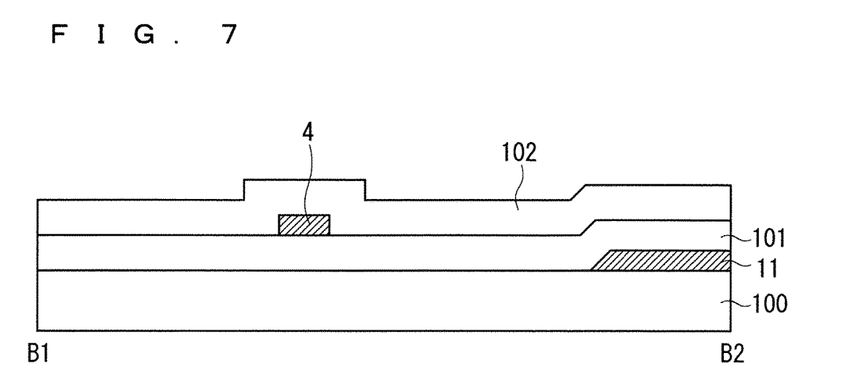

After that, on the entire surface of the gate insulating film 101, the source electrode 3, the drain electrode 4, and the signal line 12 are formed by depositing a low-resistance metal such as chromium (Cr) or molybdenum (Mo) by a sputtering method and by patterning the low-resistance metal by a selective etching process using a photolithography technology. In this step, the upper surface of the semiconductor layer 2 is exposed between the source electrode 3 and the drain electrode 4 so as to separate the ohmic contact layers 3a and 4a. As a result, the thin film transistor 10 is formed. Then, the protective film 102 is formed by laminating an insulating material such as silicon nitride on the entire surface of the gate insulating film 101 so as to cover the thin film transistor 10 (FIGS. 6 and 7).

After that, by selectively removing the protective film 102 and the gate insulating film 101, the contact hole 5 having the first sloped parts 51 and the second sloped parts 52 are formed, where each of the first sloped parts 51 and each of the second sloped parts 52 have slope angles different from each other. The contact hole 5 having the first sloped parts 51 and the second sloped parts 52 are formed by, for example, the following steps.

First, a photoresist is formed on the protective film 102, and the photoresist is exposed to light while using a photomask having a pattern of the contact hole 5. As the photomask used in this exposure step, a photomask is used in which a part of the outline of the pattern of the contact hole 5 is a gray-tone pattern. Specifically, a part of the outline of the pattern of the contact hole 5 at which the first sloped part 51 should be formed is made a gray-tone pattern.

Figure 12:
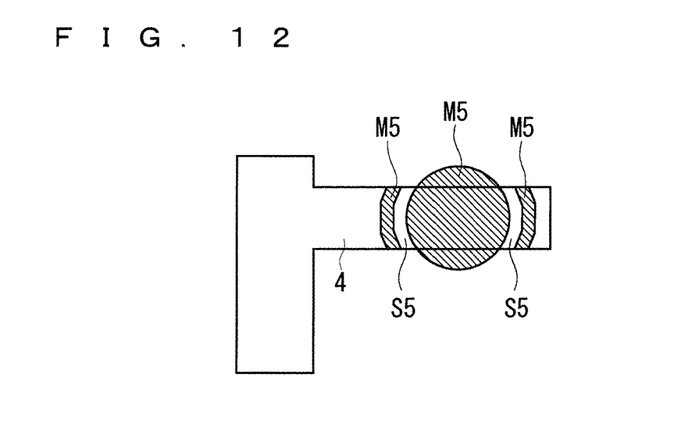
FIG. 12 is a diagram showing an example of a pattern of a photomask used in a step for forming contact holes.

FIG. 12 shows an example of the pattern of the contact hole 5 on a photomask. FIG. 12 also shows the drain electrode 4 to illustrate the positional relation between the mask pattern of the contact hole 5 and the drain electrode 4. The photoresist in the present preferred embodiment is assumed to be a positive resist; therefore, areas M5 represent transparent areas of the photomask, and areas S5 represent light shielding areas of the photomask. In the case that the first sloped parts 51 are provided on the drain electrode 4 as shown in FIG. 2, narrow light shielding areas S5 and slit-shaped transparent areas M5 are provided on the part which overlaps the drain electrode 4 as shown in FIG. 12. Generally, the width of the narrow light shielding areas S5 is set not more than a resolution of the exposure machine. The set of each of the narrow light shielding areas S5 and each of the slit-shaped transparent areas M5 functions as a gray-tone pattern which changes the intensity of exposure in the area in which the set is located. Note that Japanese Patent Application Laid-Open No. 2004-294805 discloses in detail how to form contact holes by using a gray-tone pattern.

Figure 8:
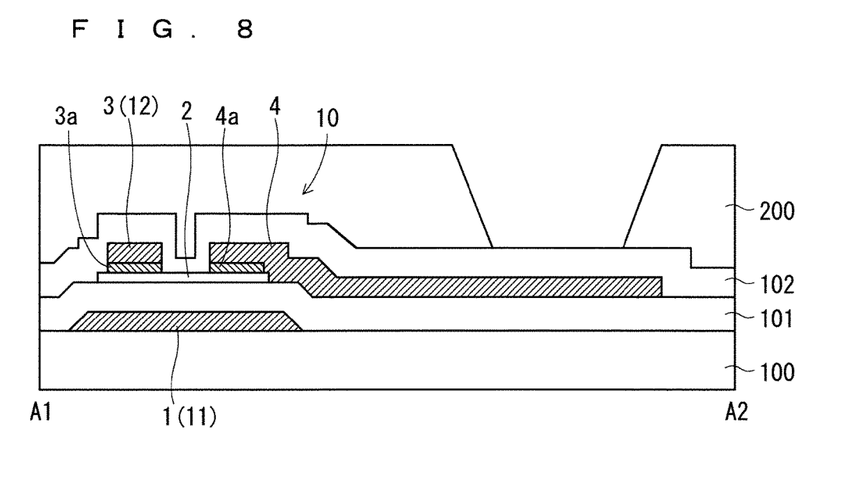
Figure 9:
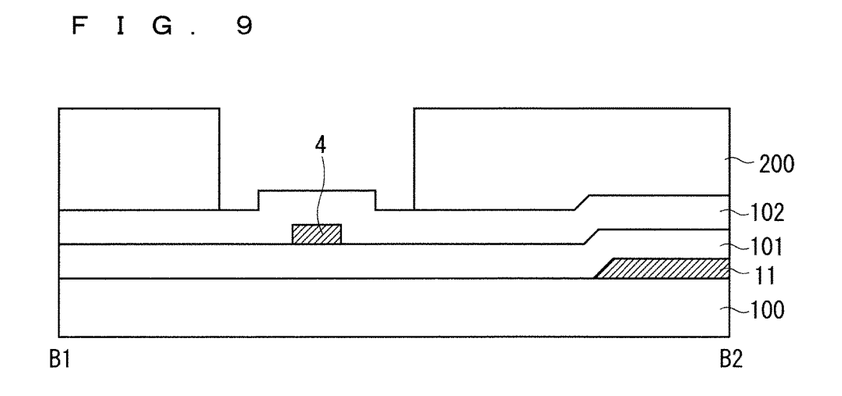

When the photoresist is exposed to light while using a photomask having the pattern shown in FIG. 12 and is then developed, a photoresist pattern 200 is formed as shown in FIGS. 8 and 9. The part, of the inner wall of the opening part of the photoresist pattern 200, exposed to light through a gray-tone pattern has a gentle slope, and the other part is substantially vertical.

Figure 10:
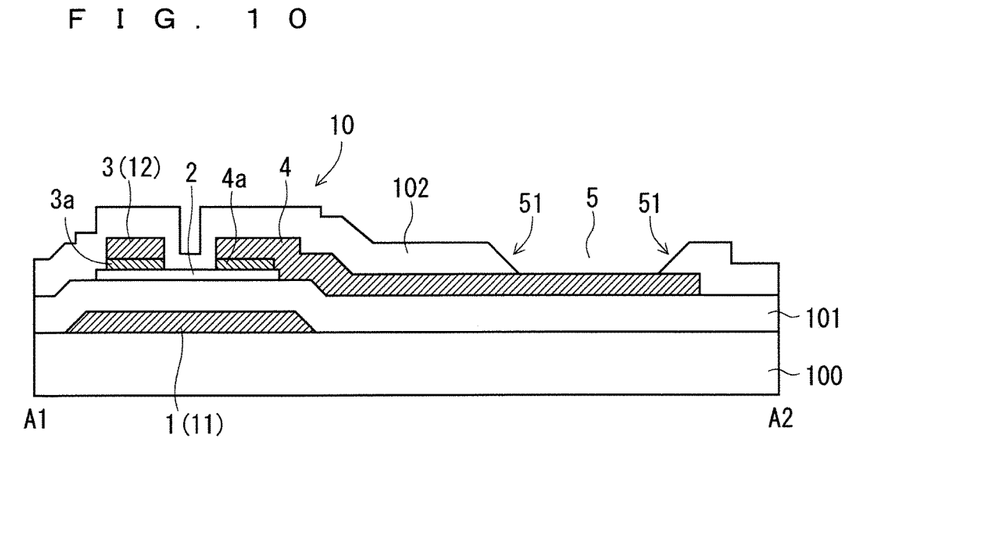
Figure 11:
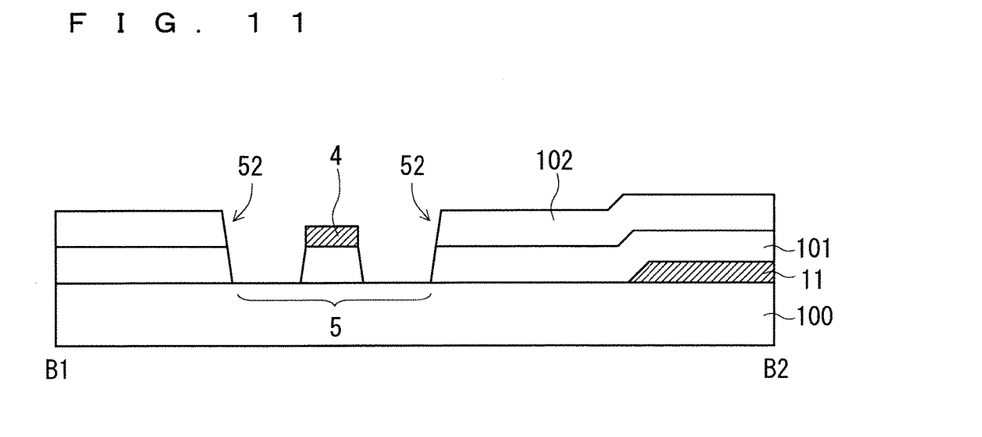

Then, the contact hole 5 is formed by etching the protective film 102 and the gate insulating film 101, using the photoresist pattern 200 as a mask. As the etching method, an anisotropic etching process such as a dry etching in a Reactive Ion Etching (RIE) mode may be used. The slope angles of the inner wall of the contact hole 5 formed in this step are reflected by the slope angles of the inner wall of the opening part of the photoresist pattern 200. That is, in the inner wall of the contact hole 5, the first sloped parts 51 having a gentle slope and the second sloped parts 52 having a steep slope are formed to correspond to the slope angles of the inner wall of the opening part of the photoresist pattern (FIGS. 10 and 11).

After that, the pixel electrode 6 is formed by depositing ITO by a sputtering method on the entire surface on the protective film 102 including the contact hole 5 and by patterning the ITO by a selective etching process using a photolithography technology. In this step, the pixel electrode 6 is electrically connected to the drain electrode 4 through the contact hole 5. Through the above steps, the configuration of the TFT array substrate shown in FIGS. 2 and 3 is obtained.

By laminating the thus formed TFT array substrate and the separately formed counter substrate with a constant interval therebetween, then filling the gap between the substrates with liquid crystal, and sealing the liquid crystal, a liquid crystal display panel is formed.

After the liquid crystal display panel is formed, an external circuit including a drive circuit and the like is connected to the liquid crystal display panel, and a backlight, which is a planar light source device having a light source such as a Light Emitting Diode (LED), a light guide plate, and the like, is disposed on the back of the liquid crystal display panel with an optical sheet therebetween in such a manner that those members are embedded in a frame, where by a liquid crystal display device is manufactured.

MODIFIED EXAMPLE

Figure 13:
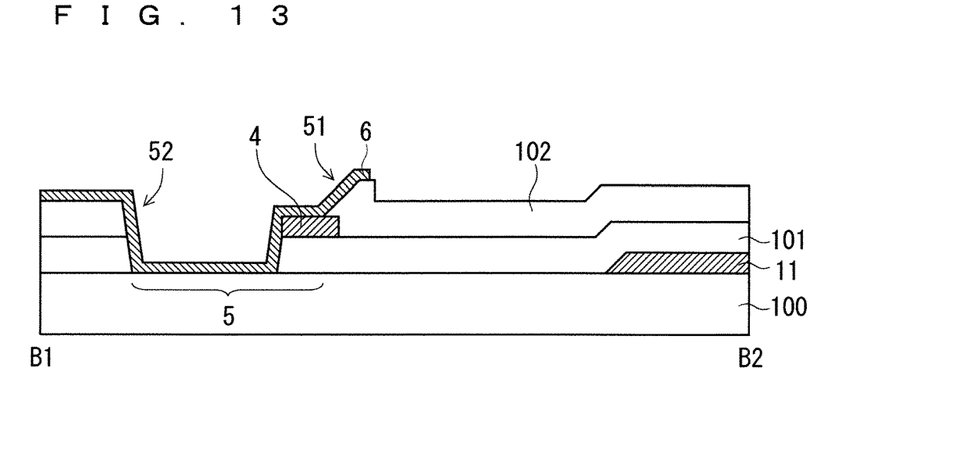
FIG. 13 is a diagram showing a modified example of a liquid crystal display device according to a preferred embodiment of the present invention.
Figure 14:
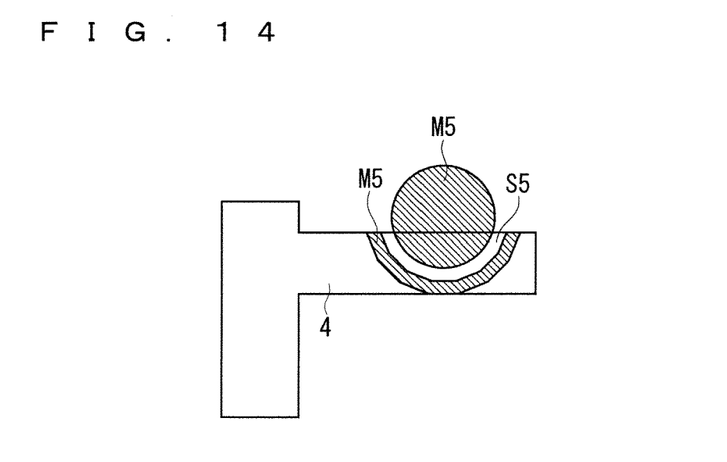
FIG. 14 is a diagram showing an example of a pattern of a photomask used in a step for forming contact holes.

In the above description, an example is described in which the contact hole 5 extends beyond the both side of the drain electrode 4 as shown FIG. 3; however, the contact hole 5 may be formed to extend beyond only one side of the drain electrode 4 as shown in FIG. 13. In this case, the percentage of the part of the inner wall of the contact hole 5 which is located on the drain electrode 4 is larger. To achieve this configuration, the pattern of the photomask to be used in the step of forming the contact hole 5 is made as shown in FIG. 14 so that the first sloped part 51 is formed in the whole of the part located on the drain electrode 4; thus, the electric connectivity between the pixel electrode 6 and the drain electrode 4 of the thin film transistor can be more favorable.

Also in the case of FIG. 13, from the point of view of increasing the aperture ratio of the pixel, the second sloped part 52 having a steep slope is provided on the side (the left side in FIG. 13), of the contact hole 5, closer to the center of the pixel area. In this case, both of the first sloped part 51 and the second sloped part 52 appear, as shown in FIG. 13, on the cross-section along line B1-B2 in FIG. 1.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   a TFT array substrate having a thin film transistor formed in each of pixel areas; and
   a counter substrate including a black matrix in which an opening part is formed in each of areas corresponding to the pixel areas, the TFT array substrate including:
      a protective film formed on a drain electrode of the thin film transistor;
      a contact hole formed in the protective film so as to reach the drain electrode; and
      a pixel electrode formed on the protective film so as to be connected to the drain electrode through the contact hole, wherein
      an inner wall of the contact hole includes a first sloped part and a second sloped part, which are aligned with each other in line in a circumferential direction of the contact hole, the circumferential direction being parallel to a main surface of the TFT array substrate, and the first sloped part and second sloped part have slope angles different from each other,
   the slope angle of the second sloped part is greater than the slope angle of the first sloped part,
   the contact hole is formed such that a part of a bottom horizontal surface of the contact hole extends beyond the drain electrode,
   the first sloped part is formed on a surface located at a part, of the inner wall of the contact hole, in which the bottom horizontal surface of the contact hole is located on the drain electrode, and
   the second sloped part is formed on a surface located at a part, of the inner wall of the contact hole, in which the bottom horizontal surface of the contact hole extends beyond the drain electrode.

2. The liquid crystal display device according to claim 1, wherein the slope angle of the first sloped part is not less than 45° and not more than 55°, and
   the slope angle of the second sloped part is not less than 80° and not more than 90°.

3. The liquid crystal display device according to claim 1, wherein the TFT array substrate includes:
   an insulating substrate,
   a gate electrode, of the thin film transistor, formed on the insulating substrate;
   a gate insulating film, of the thin film transistor, formed on the gate electrode;
   a semiconductor layer, of the thin film transistor, formed on the gate insulating film; and
   a source electrode and the drain electrode, of the thin film transistor, formed on the semiconductor layer and the gate insulating film,
   wherein the part, of the contact hole, extending beyond the drain electrode penetrates through the gate insulating film and reaches the insulating substrate.

* * * * *